April 15, 1958 L. MOYE 2,830,739
AUTOMATIC CLEARING CONDIMENT DISPENSER
Filed May 14, 1954
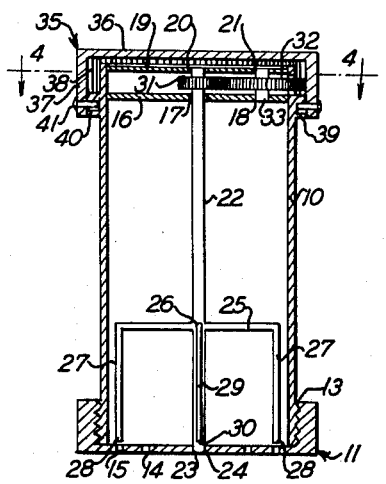
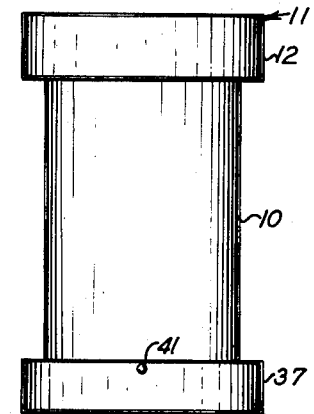
 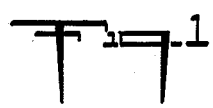
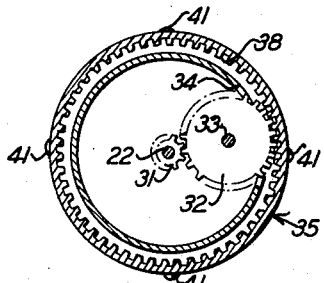 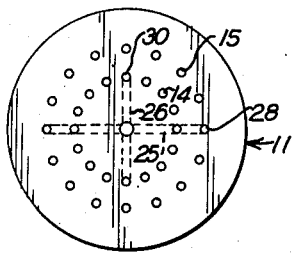
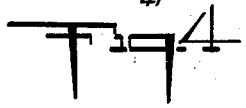 
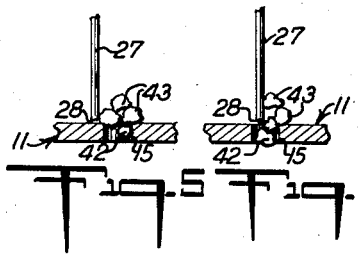
INVENTOR
LAMAR MOYE
BY Jacobi & Jacobi
ATTORNEYS

United States Patent Office 2,830,739
Patented Apr. 15, 1958

2,830,739

AUTOMATIC CLEARING CONDIMENT DISPENSER

Lamar Moye, Coral Gables, Fla.

Application May 14, 1954, Serial No. 429,770

2 Claims. (Cl. 222—148)

This invention relates to household utensils and more particularly to a dispenser for condiments such as salt. As is well-known, ordinary table salt is highly hygroscopic or in other words has a pronounced tendency to absorb moisture and upon the absorption of such moisture, becomes caked and tends to clog a dispenser for the same, particularly by incrustations formed adjacent the dispensing apertures.

Heretofore, numerous efforts have been made to overcome this difficulty and some of these have included the provision of agitating means within the dispenser. The mixing of a foreign element, such as rice with the condiment and also the use of chemical dehydrators. While chemical dehydrators are effective they soon become inactive and therefore, inoperative for the purpose intended. Furthermore as the activity of such dehydrators decreases the resulting usability of the utensil also decreases. The mechanical agitating means heretofore used have been ineffective for the purpose intended, since mere agitation of the contents of a condiment dispenser is not sufficient to prevent incrustations forming in and adjacent the dispensing openings and these mechanical agitators provide no means whatsoever for dislodging or removing such incrustations. The use of rice and other foreign materials at best, is very inefficient and likewise this, of course, reduces the capacity of the dispenser for holding the desired condiment.

It is accordingly an object of this invention to provide a condiment dispenser having mechanical agitating means which also operates to remove and dislodge any incrustations of the condiment in and about the dispensing opening.

A further object of the invention is the provision of a condiment dispenser in which the mechanical agitating and dispenser opening clearing means is provided and which may be conveniently operated with the dispenser in inverted or normal operative position, and without the necessity of the operator placing his hand in the path of flow of condiment from the dispenser.

A still further object of the invention is the provision of a condiment dispenser having mechanical means for agitating the contents thereof, and for clearing the dispensing apertures, which dispenser may be conveniently actuated in a normal position by one hand and the fingers of the user.

A further object of the invention is the provision of a condiment dispenser incorporating mechanical agitating and dispensing opening clearing means which may be economically constructed to have a pleasing appearance and which need give no outward indication that such mechanical means is incorporated therein.

A still further object of the invention is the provision of a condiment dispenser incorporating mechanical agitating and dispensing opening clearing means which may be conveniently and economically manufactured from readily available material and which will maintain high efficiency over a relatively long period of time and without undue wear or breakage of the parts.

Further objects and advantages of the invention will be apparent from the following description taken in conjunction with the accompanying drawing wherein:

Fig. 1 is an elevational view of a condiment dispenser constructed in accordance with this invention;

Fig. 2 is a longitudinal sectional view of the condiment dispenser of this invention in inverted or operative position and showing the internal structure and arrangement of parts therein;

Fig. 3 is a top plan view of the dispenser of this invention and showing in dotted lines the position of the dispensing aperture clearing means;

Fig. 4 is a sectional view on the line 4—4 of Fig. 2;

Fig. 5 is a fragmentary view to an enlarged scale showing an incrustation of condiment particles adjacent a dispensing opening and the manner in which such particles are cleared therefrom and propelled through the opening; and Fig. 6 is a view similar to Fig. 5, and showing a further step in the clearing of the dispensing opening.

With continued reference to the drawing there is shown a condiment dispenser constructed in accordance with this invention and which may well comprise an elongated hollow container 10 which may be of cylindrical or any other desired configuration, which container is closed at one end by a cap 11. Cap 11 may be provided with a flange 12 having internal screw threads 13 which engage with screw threads on the container 10 to hold the cap 11 in place thereon, but obviously, any other desired means for securing the cap 11 in place may be utilized. The cap 11 may also be provided with concentric circular series of dispensing apertures therein, there being two such series shown, the inner one being indicated at 14 and the outer at 15. Obviously, any desired number of concentric series of such apertures may be provided and obviously, the same principles of this invention will apply regardless of the number of such series. For efficient operations the apertures must however, be arranged in circles and the concentric. The number of apertures is, of course, immaterial and any desired number to provide the desired flow of condiments may be utilized.

Disposed within the container 10 and spaced from the end thereof opposite to the cap 11 is a closure plate 16 which may be secured in place by any desired means, such as welding, soldering or the like. Closure plate 16 is provided with a central aperture 17, the purpose of which will be presently described, and there may also be provided another aperture 18 which is offset, the purpose of which will likewise be presently described.

Disposed outwardly of the closure plate 16 and secured within the container 10 adjacent the end thereof, is a cross bar 19 which may be provided with an aperture 20 in alignment with the aperture 17 in the closure plate 16 and with an aperture 21 in alignment with the aperture 18 in the closure plate 16. The cross bar 19 may likewise be permanently secured in place by any desired means, such as welding, soldering or the like.

A shaft 22 is disposed axially of the container 10 and one end of the shaft extends through the aperture 17 in the closure plate 16 and into the aperture 20 in the cross bar 19. The opposite end 23 of the shaft 22 extends into an aperture 24 in the cap 11 and if desired, the end 23 may be of sufficient length to engage the aperture 24 when the cap 11 is being replaced on the container 10 and with the threads 13 just engaging the threads on the container 10. In this way, re-assembly of the cap 11 and container 10 together with the end 23 of shaft 22 will be facilitated, but, of course, if desired, the shaft 22 may be accurately positioned within the container 10 in such a manner that when the cap 11 is fully applied, the aperture 24 therein will automatically engage the end 23 of shaft 22.

Intermediate the length of shaft 22 there is secured a relatively long cross arm 25 and at right angles thereto there is secured a relatively short cross arm 26. Extending from the arm 25 is a pair of resilient fingers 27 the ends of which 28 terminate closely adjacent the inner surface of the cap 11 and in alignment with the outer series of dispensing apertures 15. Resilient fingers 27 may be made of any suitable material, such as spring wire and the operation thereof will be presently described. Extending from the cross arm 26 and spaced approximately ninety degrees from the fingers 27 are a pair of resilient fingers 29 which terminate closely adjacent the inner surface of the cap 11 and the outer ends 30 of which are in alignment with the inner series of dispensing apertures 14. The fingers 29 are made of the same material and operate in the same manner as fingers 27.

Secured to the shaft 22 between the closure plate 16 and the cross bar 19 is a pinion gear 31 and this gear meshes with an idler gear 32 which gear may be carried by a shaft 33 received in the aperture 18 in the closure plate 16 and the aperture 21 in the cross bar 19. As best shown in Figs. 2 and 4, the idler gear 32 projects through an opening 34 in the side wall of the container 10.

Disposed over the end of the container 10 opposite the cap 11 and concealing the cross bar 19 and gears therebeneath, is a base 35 which may include an imperforate central section 36 and a flange or skirt 37. The flange 37 is provided on its inner face with an internal ring gear 38 which meshes with the idler gear 32 and the container 10 is provided with an annular flange 39 which engages the inner surface of the flange 37 and accurately locates the same with respect to the container 10 and the idler gear 32. The flange 39 is provided with an annular groove 40 and a plurality of pins or screw threaded members 41 may project through the flange or skirt 37 of the base 35 and into the annular groove 40 to retain the base 35 in place on the container 10 but at the same time permit rotation of the base 35 with respect to the container 10. While one method of rotatably securing the base 35 in place on the container 10, as shown, obviously, other methods will occur to persons skilled in the art and the present showing is by way of illustration only.

While the cross bar 19 is shown as supporting the end of shaft 22 and one end of shaft 33 carrying the idler gear 32. Obviously, if desired the cross bar 19 may be omitted and the shaft 22 supported by the wall of the aperture 17 in the closure plate 16 and the idler gear 32 mounted on a stud secured to the closure plate 16. Consequently, the inclusion of the cross bar 19 merely indicates a preferred way of manufacturing the device and if desired, as explained above, this cross bar may be omitted in the interests of economy of manufacture.

In operation the condiment dispenser of this invention may be grasped in one hand of the user and the thumb or other convenient finger utilized to rotate the base 35 with relation to the container 10 and, of course, if desired, the outer surface of the flange 37 of the base 35 may be knurled or provided with a roughened surface in order to facilitate such manipulation. Rotation of the base 35 with relation to the container 10 will, of course, through the internal ring gear 38 rotate the idler gear 32 and consequently, the pinion gear 31 and shaft 22. Cross arms 25 and 26 carried by the shaft 22 as well as the fingers 27 and 29 will likewise be caused to rotate, thus agitating the contents of the container 10. At the same time, the resilient fingers 27 and 29 will operate to remove any incrustations of condiment particles in and adjacent the dispensing apertures 14 and 15 and to eject any particles lodged in such dispensing openings. As best shown in Figs. 5 and 6, one or more condiment particles 42 may be lodged in the dispensing aperture or opening 15 and a plurality of such particles 43 may be encrusted adjacent and within the dispensing opening 15. As the finger 27 rotates, the end 28 of the same will engage one of the particles 43 and as shown in Fig. 5, will tend to roll the same in a somewhat circular path toward the center of the dispensing opening 15 and due to the resilient nature of the finger 27, the particle 43 will be propelled through the opening 15 to engage and dislodge the particle 42 therein. The completion of this action is shown in Fig. 6. Thus the cross arms 25 and 26 and the fingers 27 and 29 operate not only to agitate the contents of the container 10, but also to directly engage and remove any encrustations adjacent the dispensing apertures and also to eject or propel the condiment particles through such apertures, thus thoroughly clearing the same and providing for a free dispensing of the contents of the condiment dispenser. As stated above, the ends 28 and 30 of the fingers 27 and 29 terminate closely adjacent the inner surface of the cap 11, but do not contact the same. Preferably this spacing should be somewhat less than normal grain size of any condiment utilized in the dispenser. With this spacing maintained the action of the fingers 27 and 29 will always be substantially that described above, and will operate to efficiently clear the dispensing apertures.

It will be seen by the above described invention there has been provided a relatively simple yet highly efficient condiment dispenser which may be conveniently manipulated to automatically agitate the contents thereof, and at the same time to remove any encrustation of such condiments in and around the dispensing apertures and to eject any condiment particles which may be lodged in such apertures. The provision of this automatic clearing means in no way interferes with the normal filling of the dispenser or in adequately cleaning the same, since the dispenser may be manufactured in such a manner that immersion in water will not in any way be harmful. Furthermore the inclusion of the automatic clearing means of this invention does not in any way preclude design of a condiment dispenser of pleasing appearance and almost any size and shape can be utilized provided the relationship between the resilient fingers and the dispensing apertures is maintained as described above.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. An automatic clearing condiment dispenser comprising an elongated hollow container, a cap removably secured on one end of said container, said cap having two concentric circular series of dispensing apertures therein, a closure plate fixed in said container inwardly of the opposite end, a cross bar fixed in said container adjacent the opposite end and spaced from said plate, a shaft extending axially of said container and rotatably mounted in said cap and said plate, agitating and dispensing aperture clearing means comprising a pair of cross arms fixed to said shaft intermediate the length thereof, a pair of resilient fingers extending from said arm in alignment with one series of apertures, a pair of resilient fingers extending from the upper arm in alignment with the other series of apertures, said fingers terminating adjacent the inner surface of said cap, a pinion gear fixed to said shaft between said plate and said cross bar, an idler gear rotatably mounted on said plate and cross bar and meshing with said pinion gear, a base having a flange received over the opposite end of said container, an internal gear on said flange meshing with said idler gear, and means for rotatably securing said base on said container whereby upon rotation of said base relative to said container, said cross arms and fingers will rotate to agitate the contents of said container and the ends of said fingers will yieldingly engage condiment particles encrusted in, adjacent and over said apertures and propel at least certain of said particles through said apertures.

2. An automatic clearing condiment dispenser comprising an elongated hollow container, a cap on the bottom end of said container, said cap having a circular series of dispensing apertures therein, a shaft extending axially of said container and rotatably mounted therein, agitating and dispensing aperture clearing means comprising resilient fingers fixed to said shaft and disposed in alignment with said apertures, said fingers terminating adjacent the inner surface of said cap, closure means for the top end of said container, and drive means extending exteriorly of said container for rotating said shaft whereby upon rotation of said shaft relative to said container said fingers will rotate to agitate the contents of said container and the ends of said fingers will yieldably engage condiment particles encrusted in, adjacent and over said apertures and propel at least certain of said particles through said apertures.

References Cited in the file of this patent

UNITED STATES PATENTS

| | | |
|---|---|---|
| 635,275 | Cassidy | Oct. 17, 1899 |
| 875,948 | Racouillat et al. | Jan. 7, 1908 |
| 1,010,257 | Heflin | Nov. 28, 1911 |
| 1,213,634 | Havassy | Jan. 23, 1917 |
| 2,100,216 | Hughes | Nov. 23, 1937 |